United States Patent
Egami et al.

(10) Patent No.: US 6,428,409 B1
(45) Date of Patent: Aug. 6, 2002

(54) INSIDE/OUTSIDE AIR SWITCHING DEVICE HAVING FIRST AND SECOND INSIDE AIR INTRODUCTION PORTS

(75) Inventors: Hirotaka Egami, Kariya; Yasuhiro Sato, Okazaki; Mitsutoshi Kato, Toyota, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/933,507

(22) Filed: Aug. 20, 2001

(30) Foreign Application Priority Data

Aug. 25, 2000 (JP) ........................ 2000-255591
May 11, 2001 (JP) ........................ 2001-141965

(51) Int. Cl.[7] .............................................. B60H 1/00
(52) U.S. Cl. ...................................... 454/139; 454/156
(58) Field of Search ............................... 454/139, 159, 454/156, 160, 161

(56) References Cited

U.S. PATENT DOCUMENTS 5,261,856 A * 11/1993 Walser ........................ 454/139
5,836,813 A * 11/1998 Miyata et al. ............... 181/225
5,876,277 A * 3/1999 Uemura et al. .............. 454/139

FOREIGN PATENT DOCUMENTS

JP          U-57-76120     5/1982
JP          A-11-348529    12/1999

* cited by examiner

Primary Examiner—Harold Joyce
Assistant Examiner—Derek S. Boles
(74) Attorney, Agent, or Firm—Harness, Dickey & Pierce, PLC

(57) ABSTRACT

An inside/outside air switching box has first and second inside air introduction ports, and an outside air introduction port. An inside/outside air switching door is disposed to open and close the first inside air introduction port and the outside air introduction port, and the second inside air introduction port is opened and closed by an inside air auxiliary door operated due to a pressure difference generated by operation of a blower fan between an inner side of the inside/outside air switching box and an inner side of a passenger compartment. Accordingly, even in an outside air introduction mode, inside air can be introduced from the second inside air introduction port.

12 Claims, 4 Drawing Sheets

INSIDE/OUTSIDE AIR SWITCHING DEVICE HAVING FIRST AND SECOND INSIDE AIR INTRODUCTION PORTS

CROSS-REFERENCE TO RELATED APPLICATION

This application is based upon and claims the benefit of Japanese Patent Applications No. 2000-255591 filed on Aug. 25, 2000 and No. 2001-141965 filed on May 11, 2001, the contents of which are incorporated herein by reference.

BACKGROUND OF THE INVENTION

1. Field of the Invention

The present invention relates to an inside/outside air switching device using a rotary door. More particularly, the preset invention relates to a structure for partially introducing inside air in an outside air introduction mode.

2. Description of Related Art

In an inside/outside air switching device disclosed in JP-A-11-348529, an inside/outside air switching box has a first inside air introduction port and a second inside air introduction port for introducing inside air inside a passenger compartment, and an outside air introduction port for introducing outside air outside the passenger compartment. In the inside/outside air switching box, the outside air introduction port is provided to be proximate to the first inside air introduction port with respect to the second inside air introduction port. The second inside air introduction port is an auxiliary port for increasing an inside air amount. An inside/outside air switching door and an inside air auxiliary door are rotary type doors, and are disposed in the inside/outside air switching box. The inside/outside air switching door is used for opening and closing the first inside air introduction port and the outside air introduction port. The inside air auxiliary door is used for opening and closing the second inside air introduction port.

That is, in an inside air introduction mode, inside air is introduced from both the first and the second inside air introduction ports, so that a large amount of air is introduced and an air conditioning capacity is improved. However, in an outside air introduction mode, both the first and second inside air introduction ports are closed, and only outside air with a large air-conditioning load is introduced from the outside air introduction port. Therefore, an air conditioning device having a large air-conditioning capacity is required. Accordingly, it is necessary to increase a volume of the air conditioning device or motive power of a blower fan.

In addition, the inside air auxiliary door and the inside/outside air switching door are operatively linked through a link member to be simultaneously rotated. Therefore, a structure of the link member for rotating both the doors together is complicated and a large number of components are required.

SUMMARY OF THE INVENTION

In view of the foregoing problems, it is an object of the present invention to provide an inside/outside air switching device having first and second inside air introduction ports, in which an inside air auxiliary door for opening and closing the second inside air introduction port is operated using a negative pressure generated by operation of a blower fan, so that inside air can be partially introduced in an outside air introduction mode while motive power for rotating the inside air auxiliary door can be saved.

According to the present invention, in an inside/outside air switching device, an inside/outside air switching box has first and second inside air introduction ports and an outside air introduction port, an inside/outside air switching door is disposed for selectively opening and closing the first inside air introduction port and the outside air introduction port, an inside air auxiliary door is disposed in the inside/outside air switching box for opening and closing the second inside air introduction port, and a blower unit is disposed at a downstream air side of the inside/outside air switching door for sucking and blowing air introduced from the outside air introduction port and the first and the second inside air introduction ports. The inside air auxiliary door has an upper edge supported in the inside/outside air switching box, and is rotatable around the upper edge to open the second inside air introduction port due to a pressure difference between an inner side of the inside/outside air switching box around the inside air auxiliary door and an inner side of a passenger compartment when the blower unit operates. Accordingly, in an outside air introduction mode where the inside/outside air switching door opens the outside air introduction port and closes the inside air introduction port, outside air can be introduced from the outside air introduction port, while inside air is introduced from the second inside air introduction port opened by the inside air auxiliary door that is driven using the pressure difference.

Because the inside air auxiliary door is operated by using the pressure difference, motive power for rotating the inside air auxiliary door is saved. In addition, because inside air can be partially introduced while outside air is introduced from the outside air introduction port in the outside air introduction mode, an air-conditioning capacity is improved in a vehicle air conditioner while consumed power for adjusting air state blown into the passenger compartment is reduced. On the other hand, in an inside air introduction mode, since inside air is introduced from both the first inside air introduction port and the second inside air introduction port, a large amount of inside air is introduced. Moreover, because the inside air auxiliary door is operated only using the pressure difference, a link member for driving the inside air auxiliary door is unnecessary, and production cost of the inside/outside air switching device can be reduced.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
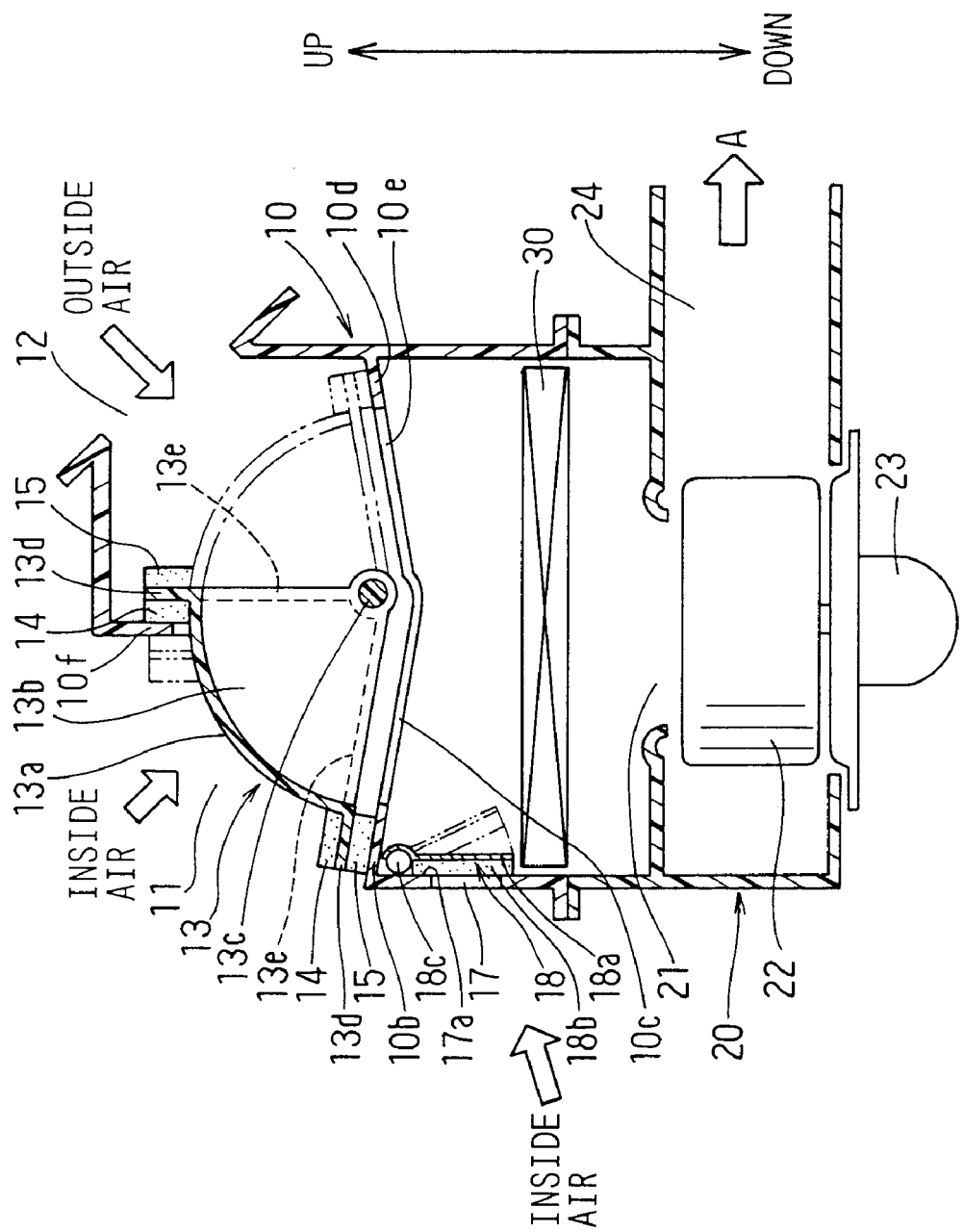
FIG. 1 is a schematic sectional view showing an inside/outside air switching device, according to a preferred embodiment of the present invention.

A preferred embodiment of the present invention will be described hereinafter with reference to the accompanying drawings. FIG. 1 shows an inside/outside air switching device (blower unit) disposed in a ventilation system of a vehicle air conditioner. Generally, the blower unit is disposed under an instrument of a vehicle on a front-passenger's side. An inside/outside air switching box (case) 10 made of a plastic resin defines an air passage of the inside/outside air switching device. A scroll casing 20 is adjacently disposed under the inside/outside air switching box 10, so that an inner side of the inside/outside air switching box 10 communicates with a bell-mouth like suction port 21 of the scroll casing 20.

Figure 2:
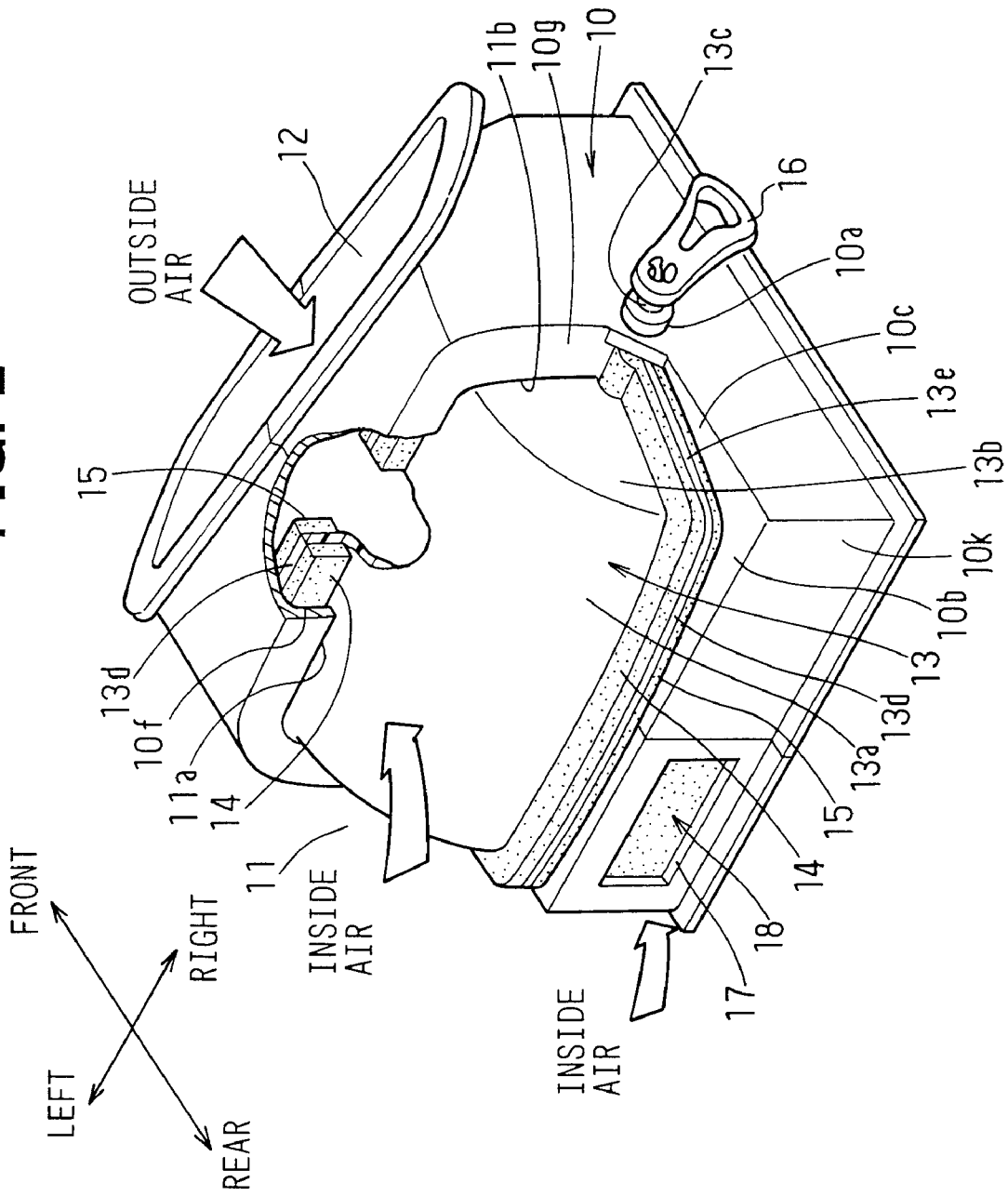
FIG. 2 is a partially-sectional perspective view showing the inside/outside air switching device of the embodiment.

As shown in FIG. 2, the inside/outside air switching box 10 has a first inside air introduction port 11, a second inside air introduction port 17 and an outside air introduction port 12. The first inside air introduction port 11 and the second inside air introduction port 17 are disposed to be opened at a passenger compartment side (a vehicle rear side) so that inside air inside the passenger compartment can be introduced from the first and second inside air introduction ports 11, 17. The outside air introduction port 12 is disposed to be opened at an engine compartment side so that outside air outside the passenger compartment is introduced from the outside air introduction port 12. The rotary door 13 is rotatably disposed in the inside/outside air switching box 10 to open and close the first inside air introduction port 11 and the outside air introduction port 12.

The rotary door 13 has a circumference wall 13a, and a circumference angle of the circumference wall 13a is approximately 70°, for example, as shown in FIG. 2. Both side portions of the circumference wall 13a in an axial direction of a rotation shaft 13c are closed by both fan-shaped side plates 13b, respectively. The rotation shaft 13c is disposed at a center position in a curvature radius of the circumference wall 13a, and both axial end portions of the rotation shaft 13c protrude toward outside in the axial direction from the side plates 13b. The circumference wall 13a is positioned at an upper side of the rotation shaft 13c, and both the end portions of the rotation shaft 13c protruding toward outside in the axial direction are rotatably supported in bearing holes 10a (see FIG. 2) provided in the inside/outside air switching box 10.

Flange-like protrusion walls 13d, 13e are provided at periphery end parts of the circumference wall 13a and both the side plates 13b. Among the protrusion walls 13d, 13e, the protrusion wall 13d is placed at both ends of the circumference wall 13a in a circumference direction to protrude from both the ends of the circumference wall 13a toward radial outside. On the other hand, the protrusion wall 13e is provided to protrude from both periphery end parts of each side plate 13b toward outside in the axial direction.

The circumference wall 13a, both the side plates 13b, the rotation shaft 13c and the flange-like protrusion walls 13d, 13e of the rotary door 13 are integrally formed using a resin material such as polypropylene to be simply manufactured. Packing members 14, 15 are bonded onto the both surfaces of the protrusion walls 13d, 13e, entirely. The packing members 14, 15 are used as seal members for preventing an air leakage when the rotary door 13 closes the air introduction port 11 or the outside air introduction port 12. For example, the packing members 14, 15 are made of a porous elastic material such as urethane foam.

The inside air introduction port 11 is formed into a shape having a circumference opening 11a opposite to the circumference wall 13a of the rotary door 13, and side openings 11b extending from the circumference opening 11a toward the rotation shaft 13c at both sides of the rotation shaft 13c. That is, the inside air introduction port 11 is opened on the circumference side and the side surface sides of the rotary door 13 to correspond to the shape of the inside air introduction port 11. Accordingly, inside air can be introduced into the inside/outside air switching box 10 from the openings 11a, 11b of the inside air introduction port 11. On the other hand, the outside air introduction port 12 is constructed by only a circumference opening opposite to the circumference wall 13a of the rotary door 13.

In FIG. 1, up-down direction corresponds to an actual arrangement direction of the blower unit mounted on a vehicle. As shown in FIG. 1, the rotation shaft 13c of the rotary door 13 is disposed at an approximate center under lower sides of both the inside air introduction port 11 and the outside air introduction port 12 within the inside/outside air switching box 10. Seal surfaces 10b, 10c, and seal surfaces 10d, 10e are provided in the inside/outside air switching box 10 at both sides of the rotation shaft 13c to be tilted downward toward the rotation shaft 13c. In addition, the seal surfaces 10f, 10g are provided at upper side positions of the rotation shaft 13c.

The seal surfaces 10b–10g are provided in the inside/outside air switching box 10 so that surfaces of the protrusion walls 13d, 13e of the rotary door 13 contact the seal surfaces 10b–10g at a rotated position (i.e., the chain line position in FIG. 1) of an inside air introduction of the rotary door 13 and at a rotated position (i.e., the solid line position in FIG. 1) of an outside air introduction of the rotary door 13.

In FIG. 2, left-right direction and front-rear direction correspond to the actual arrangement directions of the inside/outside air switching box 10 mounted on the vehicle. AS shown in FIG. 2, the inside /outside air switching box 10 is formed by connecting at least two separate cases 10k, 10j which are separable in the left-right direction of the vehicle. In this embodiment, the seal surfaces 10b–10g are integrally provided on the inside/outside air switching box 10.

A switching link member 16 made of resin is integrally connected to one side end of the rotation shaft 13c of the rotary door 13, as shown in FIG. 2. For operating the rotary door 13, a manual operation force of an inside/outside air switching member (e.g., manual operation member) provided in an air-conditioning operation panel can be transmitted to the rotation shaft 13c from the switching link member 16 through a cable or the like. Alternatively, an electrical switch is operated by an inside/outside air switching operation member of an air-conditioning control panel to electrically operate an actuator (motor), and the rotary door 13 can be electrically operated by the actuator through the switching link member 16 and the rotation shaft 13c.

An air filter 30 for filtering dust contained in air and for removing a smelling component in air, is constructed by supporting a filter material such as a wave-shaped filter paper and urethane foam in a resinous frame. As shown in FIG. 1, the air filter 30 is formed into a flat shape, and is disposed in the inside/outside air switching box 10 at a downstream air side of the rotation shaft 13c of the rotary door 13. Thus, the rotation of the rotary door 13 is not affected by the air filter 30. The scroll casing 20 is made of a resin, and a blower fan 22 composed of a centrifugal multi-blade fan (sirocco) is disposed at a center position in a scroll shape of the scroll casing 20. That is, the fan 22 is disposed in the scroll casing 20 so that air sucked from a suction port 21 flows toward a radial outside of the fan 22 as shown by arrow A in FIG. 1 by the rotation of the fan 22. The fan 22 is connected to a rotation shaft of a driving motor 23 to be rotated.

An outlet 24 of the scroll casing 20 in FIG. 1 is connected to a cooling unit and a heating unit (not shown) so that air is blown into the passenger compartment after being cooled, dehumidified and heated while passing through both the cooling and heating units.

Next, a main part of the present invention will be now described in detail. As shown in FIG. 2, the second inside air introduction port 17 is provided in a side wall of the separate case 10j which is positioned under the first inside air introduction port 11 of the inside/outside air switching box 10. An inside air auxiliary door 18, for opening and closing the second inside air introduction port 17, is disposed below an axial line of the rotation shaft 13c of the rotary door 13 and above the air filter 30 in the inside/outside air switching box 10 so that the rotation of the rotary door 13 is not affected.

Figure 3A:
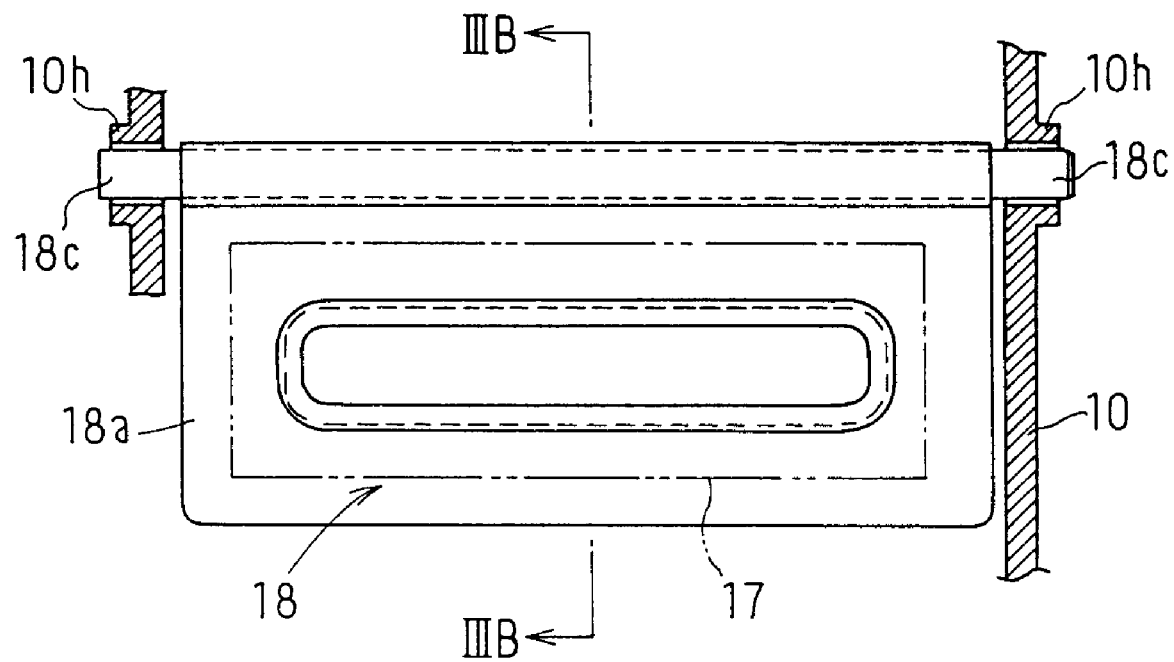
FIG. 3A is an enlarged front view showing an inside air auxiliary door.
Figure 3B:
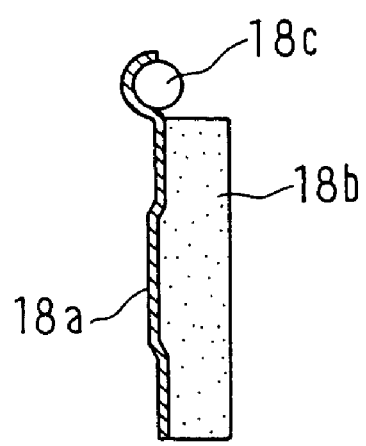
FIG. 3B is a cross-sectional view of the inside air auxiliary door taken along line $III_B$—$III_B$ in FIG. 3A, according to the embodiment.

As shown in FIGS. 3A, 3B, in the inside air auxiliary door 18, a door member 18a made of a thin plate and a rotation shaft 18c are integrally formed. Moreover, a packing member 18b is attached to one side surface of the door member 18a, facing the second inside air introduction port 17. As shown in FIG. 1, a seal surface 17a is provided on an inner surface of a wall part defining the second inside air introduction port 17, in the inside/outside air switching box 10. When the second inside air introduction port 17 is closed by the inside air auxiliary door 18, the packing member 18 air-tightly contacts the seal surface 17a for preventing an air leakage. For example, the packing member 18b is made of a porous elastic material such as urethane foam.

As shown in FIG. 3A, both end portions of the rotation shaft 18c protrude toward outside in the axial direction from the door member 18a and are rotatably supported in bearing holes 10h which are provided above the second inside air introduction port 17 in the inside/outside air switching box 10. When the blower fan 22 is not operated, the inside air auxiliary door 18 is at a vertical position (in a gravity force direction) as shown by the solid line in FIG. 1 and closes the second inside air introduction port 17.

When the blower fan 22 is operated, an air pressure around the inside air auxiliary door 18 inside the inside/outside air switching box 10 becomes negative. Therefore, a pressure difference occurs between inside the passenger compartment and inside the inside/outside air switching box 10. By using this air pressure difference, as shown by the chain line in FIG. 1, the inside air auxiliary door 18 is rotated to open the second inside air introduction port 17 and hence a part of the inside air is introduced into the inside/outside air switching box 10 from the passenger compartment. An opening degree of the inside air auxiliary door 18 is controlled in accordance with a weight (the gravity force) of the inside air auxiliary door 18 and a negative pressure generated by the blower fan 22. That is, an inside air amount introduced from the second inside air introduction port 17 is controlled by controlling the opening degree of the inside air auxiliary door 18. Accordingly, by suitably changing the weight of the inside air auxiliary door 18, the predetermined inside air amount introduced from the second inside air introduction port 17 can be obtained.

Next, an operation of the inside/outside air switching device according to the present embodiment will be now described. By rotating the rotary door 13 around the rotation shaft 13c, an inside air introduction mode or an outside air introduction mode can be selectively switched. When the outside air introduction mode is selected, the rotary door 13 is rotated up to the solid line position of FIG. 1. (FIG. 2 also shows the outside air introduction mode) In this case, the circumference wall 13a of the rotary door 13 closes the circumference opening 11a of the inside air introduction port 11, and both the side plates 13b of the rotary door 13 close both the side openings 11b of the first inside air introduction port 11. On the other hand, because the circumference wall 13a of the rotary door 13 is separated from the air passage of the outside air introduction port 12, the outside air introduction port 12 becomes in a fully opened state. Further, because the packing members 14, 15 attached to the protrusion walls 13d, 13e of the rotary door 13 press-contact the seal surfaces 10b, 10c, 10f, 10g of the inside/outside air switching box 10, an entire end surface of the rotary door 13 is sealed relative to the inside/outside air switching box 10.

In the outside air introduction mode, because the whole circular arc space within the rotary door 13 communicates with the outside air introduction port 12 and an upstream side of the air filter 30, outside air introduced from the outside air introduction port 12 flows through a passage beside the rotary door 13 and a passage inside the rotary door. Then, the outside air uniformly flows through an entire surface of the air filter 30, by the rotation of the blower fan 22. While the outside air introduced from the outside air introduction port 12 passes through the air filter 30, dust and smelling components and the like contained in air can be removed and absorbed. Thereafter, the outside air is sucked into the scroll casing 20 from the suction port 21, and is blown toward the cooling unit and the heating unit.

Further, by the rotation of the blower fan 22, air pressure around the air filter 30 and the inside air auxiliary door 18 in the inside/outside air switching box 10 reduces to become negative. Therefore, the air pressure difference occurs between inside air inside the passenger compartment and air inside the inside/outside air switching box 10. By using this air pressure difference, the inside air auxiliary door 18 is rotated to open the second inside air introduction port 17. Therefore, in the outside air introduction mode, inside air is partially introduced from the second inside air introduction port 17 while outside air is introduced from the outside air introduction port 12.

Next, when the inside air introduction mode is selected, the rotary door 13 is rotated from the solid line position to the chain line position in FIG. 1 in the clockwise direction by approximately 70°. In this case, the packing members 14, 15 attached to the protrusion walls 13d, 13e of the rotary door 13 press-contact the seal surfaces 10d, 10e, 10f, 10g of the rotary door 13, respectively, so that the entire peripheral end surface of the rotary door 13 is sealed relative to the seal surfaces 10d, 10e, 10f, 10g of the inside/outside air switching box 10. Therefore, in the inside air introduction mode, the outside air introduction port 12 is closed and the first inside air introduction port 11 is fully opened, so that inside air introduced from the first inside air introduction port 11 flows through the passage beside the rotary door 13 and the passage inside the rotary door 13. Then, the inside air uniformly flows through the entire surface of the air filter 30, by the rotation of the blower fan 22.

Even in the inside air introduction mode, the air pressure around the air filter 30 and the inside air auxiliary door 18 in the inside/outside air switching box 10 becomes negative by the rotation of the blower fan 22. Therefore, the air pressure difference occurs between inside air inside the passenger compartment and air inside the inside/outside air switching box 10. By using this air pressure difference, the inside air auxiliary door 18 rotates and the second inside air introduction port 17 is opened. In the present embodiment, especially, the second inside air introduction port 17 and the inside air auxiliary door 18 are disposed at a lower side of the first inside air introduction port 11 which approximately opposes to the second outside air introduction port 12. Accordingly, as shown in FIG. 1, the second inside air introduction port 17 is substantially opposite to the outside air introduction port 17 with respective to the rotation shaft 13c. Therefore, an inside air amount introduced from the second inside air introduction port 17 in the outside air introduction mode is larger than that of the inside air introduction mode, because the pressure difference in the outside air introduction mode is larger than that in the inside air introduction mode.

According to the above-mentioned inside/outside air switching device, in the outside air introduction mode, both the outside air and a part of the inside air are introduced from the outside air introduction port 12 and the second inside air introduction port 17, respectively, and thereafter, are blown together into the cooling unit and the heating unit. Therefore, heat load of air blown to the cooling unit and the heating unit connected a downstream side of the inside/outside air switching box 10 is reduced. When a heating operation is performed in the outside air introduction mode, for example, outside air introduced from the outside air introduction port 12 is slightly heated by inside air introduced from the second inside air introduction port 17, and thereafter, the mixed air is blown into the heating unit. Therefore, a heating capacity of the heating unit, for heating air, can be made lower, and motive power required for heating air can be saved. Similarly, when a cooling operation is performed in the outside air introduction mode, power required for cooling air can be saved.

Since the inside air auxiliary door 18 is opened and closed by the air pressure difference (negative pressure) generated by the rotation of the blower fan 22, inside air is partially introduced from the second inside air introduction port 17 not only in the outside air introduction mode but also in the inside air introduction mode. Therefore, a large amount of air is introduced into the inside/outside air switching box 10, and an opening area of the first inside air introduction port 11 and the outside air introduction port 12 can be set smaller by providing the second inside air introduction port 17. Furthermore, components such as a link member for opening and closing the inside air auxiliary door 18, are unnecessary.

In the present embodiment, the inside air auxiliary door 18 is constructed in such a manner that, the door 18a of a thin plate is integrated with the rotation shaft 18c, and the packing member 18b is bonded onto the door member 18a. Therefore, an opening degree of the inside air auxiliary door 18, in other wards, an air amount introduced from the second inside air introduction port 17 is calculated from the relation between the weight of the inside air auxiliary door 18 and the negative air pressure generated by the blower fan 22. Thus, a predetermined inside air amount can be ensured by adjusting the weight of the inside air auxiliary door 18. Moreover, since the packing member 18b is bonded onto the door member 18a, the inside air auxiliary door 18 can sealingly close the second inside air introduction port 17 using the packing member 18b when the blower fan 22 is not operated.

Although the present invention has been fully described in connection with the preferred embodiment thereof with reference to the accompanying drawings, it is to be noted that various changes and modifications will become apparent to those skilled in the art.

Figure 4A:
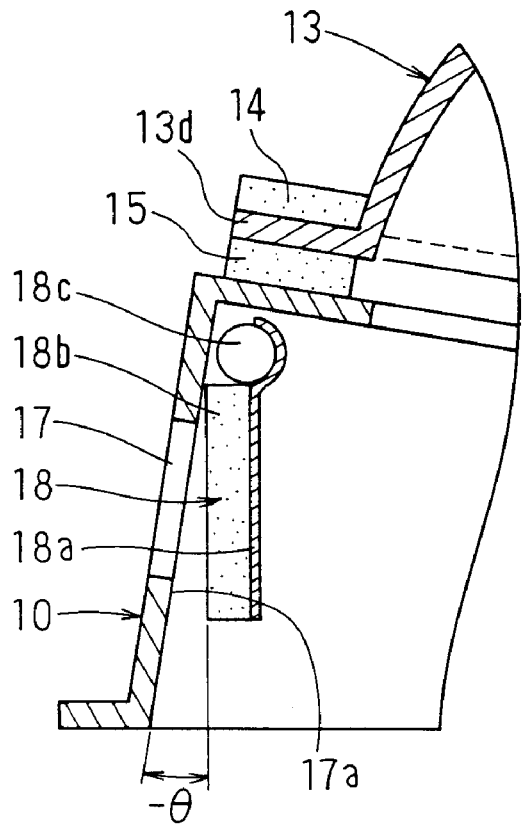
FIGS. 4A and 4B are partial sectional views each showing an inside air auxiliary door according to a modification of this embodiment.
Figure 4B:
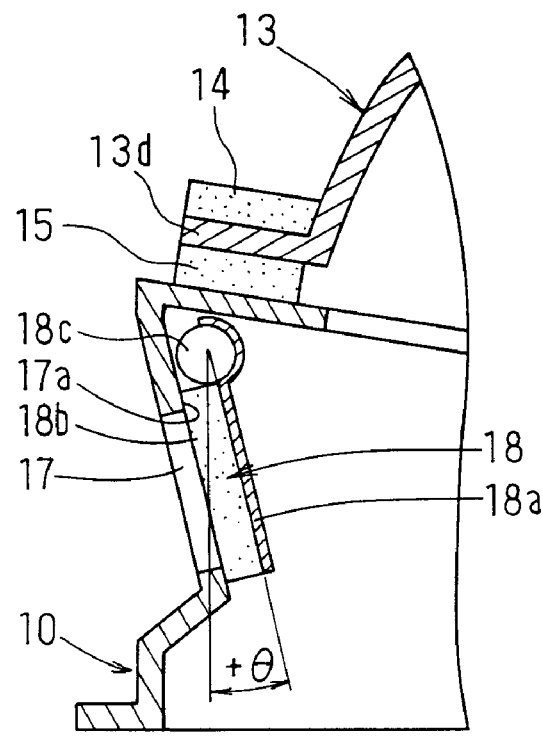
Figure 4C:
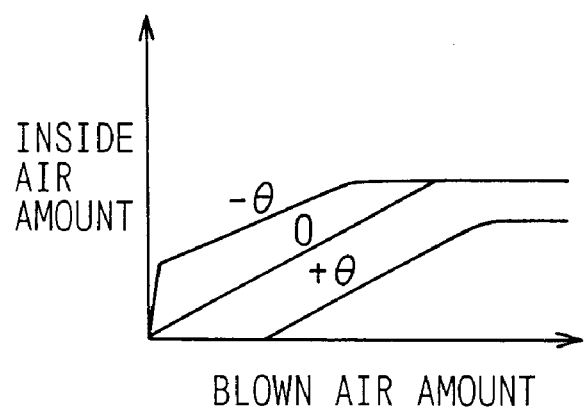
FIG. 4C is a graph showing relationships between an inside air amount and an air amount blown by a blower fan when a tilt angle of a seal surface is changed.

For example, as shown in FIGS. 4A–4C, the seal surface 17a of the inside air introduction port 17 can be tilted by a predetermined tilt angle θ relative to the vertical direction. In FIG. 4A, the seal surface 17a is tilted at θ degree outward (−θ degree) from an upright position of the inside air auxiliary door 18. In this case, the inside air introduction port is open at θ degree even when the blower fan 22 is not operated. In this case, inside air can be readily introduced even when the air amount blown by the blower fan 22 is small. On the other hand, as shown in FIG. 4B, when the seal surface 17a is tilted at θ degree inward (+θ degree) from the upright position of the inside air auxiliary door 18, inside air is introduced from the second inside air introduction port 17 after the air amount blown by the blower fan 22 is increased to a predetermined amount. That is, as shown in FIG. 4C, when the seal surface 17a is provided vertically to contact to the packing member 18b, that is, when θ=0, the inside air amount introduced from the second inside air introduction port 17 is increased as the air amount (blower capacity) blown by the blower fan 22 increases, and becomes constant after the air amount blown by the blower fan 22 increases to a predetermined amount. When the seal surface 17a is tilted relative to the vertically positioned door 18 by −θ, the inside air amount introduced from the second inside air introduction port 17 is readily increased as compared with a case where θ=0. Further, when the seal surface 17a is tilted relative to the vertically positioned door 18 by +θ, the inside air amount can be introduced from the second inside air introduction port 17 after the air amount blown by the blower is increased to a predetermined amount. Accordingly, the inside air amount introduced from the second inside air introduction port 17 can be changed by tilting the seal surface 17a. Here, when the seal surface 17a is tilted inward at +θ degree, the inside air auxiliary door 18 becomes more stable while the blower fan 22 is not operated.

Further, addition to the second inside air introduction port 17 and the inside air auxiliary door 18 provided in the side wall of the separate case 10j, another inside air introduction port and an inside air auxiliary door may be provided at a side wall of another separate case 10k next to the divided separate case 10j. In this case, the inside air amount introduced into the inside/outside air introduction box 10 can be increased further more.

Moreover, the present invention may be applied to an inside/outside air switching device where a plate-like door or a film-like door including a rotation shaft is used in place of the rotary door 13.

In the above-described embodiment, the air filter 30 is disposed at an upstream side of the suction port 21 of the blower fan 22. However, the present invention may be applied to an inside/outside air switching device without providing the air filter. Furthermore, the present invention is not limited to the inside/outside air switching device for a vehicle, but may be applied to other air suction port switching devices.

In the above-described embodiment, the rotation shaft 18c of the inside air auxiliary door 18 is disposed approximately horizontally at an upper end side of the plate-like door member 18a to be integrated with the door member 18a. However, the rotation shaft 18c of the inside air auxiliary door 18 can be disposed approximately vertically at a side end of the door member 18a to be integrated with the door member 18a. Even in this case, by suitably controlling the weight of the inside air auxiliary door 18, the door 18 can be driven and rotated by the pressure difference between the inside of the inside/outside air switching box 10 and the inside of the passenger compartment.

Such changes and modifications are to be understood as being within the scope of the present invention as defined by the appended claims.

What is claimed is:

1. An inside/outside air switching device for a vehicle having a passenger compartment, comprising:
    an inside/outside air switching box having first and second inside air introduction ports from which inside air inside the passenger compartment is introduced, and an outside air introduction port from which outside air outside the passenger compartment is introduced;
    an inside/outside air switching door, for selectively opening and closing the first inside air introduction port and the outside air introduction port, the inside/outside air switching door being disposed in the inside/outside air switching box to open the outside air introduction port and close the first inside air introduction port in an outside air introduction mode;
    an inside air auxiliary door, for opening and closing the second inside air introduction port, disposed in the inside/outside air switching box; and
    a blower unit, disposed at a downstream air side of the inside/outside air switching door, for sucking and blowing air introduced from the outside air introduction port and the first and second inside air introduction ports, wherein
    the inside air auxiliary door has an upper edge supported in the inside/outside air switching box, and is disposed to be rotatable around the upper edge and to open the second inside air introduction port in the outside air introduction mode by a pressure difference between an inner side of the inside/outside air switching box around the inside air auxiliary door and an inner side of the passenger compartment;
    the inside/outside air switching box is composed of at least two separate cases which are separable; and
    the second inside air introduction port and the inside air auxiliary door are provided in at least one of the separate cases.

2. The inside/outside air switching device according to claim 1, wherein:
    the inside/outside air switching door is a rotary door having a rotation shaft;
    the second inside air introduction port is provided in a side wall of the inside/outside air switching box, to be positioned below the first inside air introduction port and to substantially opposite to the outside air introduction port with respect to the rotation shaft of the rotary door; and
    the inside air auxiliary door is disposed at a downstream air side of the rotation shaft.

3. The inside/outside air switching device according to claim 1, further comprising:
    an air filter disposed at a downstream air side of the inside air auxiliary door, for purifying air introduced from the first and the second inside air introduction ports and the outside air introduction port.

4. The inside/outside air switching device according to claim 1, wherein:
    the inside air auxiliary door includes a rotation shaft for rotating the inside air auxiliary door, and a plate member integrated with the rotation shaft; and
    the rotation shaft is disposed at a position upper than the second inside air introduction port.

5. An inside/outside air switching device for a vehicle having a passenger compartment, comprising:
    an inside/outside air switching box having first and second inside air introduction ports from which inside air inside the passenger compartment is introduced, and an outside air introduction port from which outside air outside the passenger compartment is introduced;
    an inside/outside air switching door, for selectively opening and closing the first inside air introduction port and the outside air introduction port, the inside/outside air switching door being disposed in the inside/outside air switching box to open the outside air introduction port and close the first inside air introduction port in an outside air introduction mode;
    an inside air auxiliary door, for opening and closing the second inside air introduction port, disposed in the inside/outside air switching box; and
    a blower unit, disposed at a downstream air side of the inside/outside air switching door, for sucking and blowing air introduced from the outside air introduction port and the first and second inside air introduction ports; wherein
    the inside air auxiliary door has an upper edge supported in the inside/outside air switching box, and is disposed to be rotatable around the upper edge and to open the second inside air introduction port in the outside air introduction mode by a pressure difference between an inner side of the inside/outside air switching box around the inside air auxiliary door and an inner side of the passenger compartment;
    the inside air auxiliary door includes a rotation shaft for rotating the inside air auxiliary door, and a plate member integrated with the rotation shaft;
    the rotation shaft is disposed at a position upper than the second inside air introduction portions; and
    the inside air auxiliary door further includes a packing member bonded on a side surface of the plate member to face the second inside air auxiliary port.

6. An inside/outside air switching device for a vehicle having a passenger compartment, comprising:
    an inside/outside air switching box having first and second inside air introduction ports from which inside air inside the passenger compartment is introduced, and an outside air introduction port from which outside air outside the passenger compartment is introduced;
    an inside/outside air switching door, for selectively opening and closing the first inside air introduction port and the outside air introduction port, the inside/outside air switching door being disposed in the inside/outside air switching box to open the outside air introduction port and close the first inside air introduction port in an outside air introduction mode;
    an inside air auxiliary door, for opening and closing the second inside air introduction port, disposed in the inside/outside air switching box; and
    a blower unit, disposed at a downstream air side of the inside/outside air switching door, for sucking and blowing air introduced from the outside air introduction port and the first and second inside air introduction ports; wherein
    the inside air auxiliary door has an upper edge supported in the inside/outside air switching box, and is disposed to be rotatable around the upper edge and to open the second inside air introduction port in the outside air introduction mode by a pressure difference between an inner side of the inside/outside air switching box around the inside air auxiliary door and an inner side of the passenger compartment; and
    the inside/outside air switching box has a seal surface provided on an inner surface of a wall part defining the inside air introduction port.

7. The inside/outside air switching device according to claim 6, wherein the seal surface is disposed to be tilted by a predetermined angle relative to a vertical direction.

8. The inside/outside air switching device according to claim 6, wherein the seal surface is disposed substantially vertically.

9. The inside/outside air switching device according to claim 1, wherein the pressure difference between the inner side of the inside/outside air switching box around the inside air auxiliary door and the inner side of passenger compartment is generated by the operation of the blower unit.

10. The inside/outside air switching device according to claim 1, wherein the inside air auxiliary door is disposed in such a manner that an opening degree of the second inside air introduction port is increased as the pressure difference increases.

11. The inside/outside air switching device according to claim 1, wherein the inside air auxiliary door is disposed to open the second inside air introduction port when the pressure difference is larger than a predetermined value.

12. The inside/outside air switching device according to claim 1, wherein the inside air auxiliary door is disposed to close the second inside air introduction port when operation of the blower unit is stopped.

* * * * *